F. E. GREGORY.
AUTOMOBILE LAMP.
APPLICATION FILED JUNE 18, 1920.
1,426,181. Patented Aug. 15, 1922.
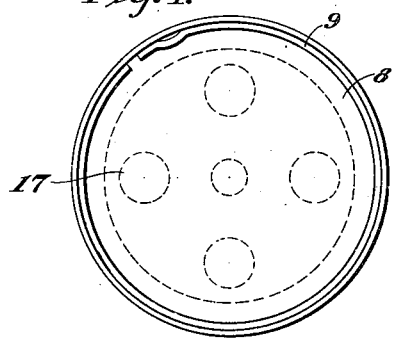
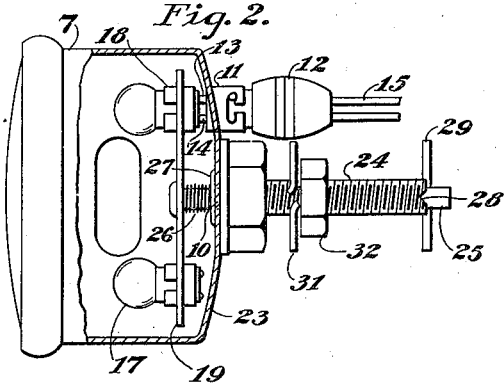
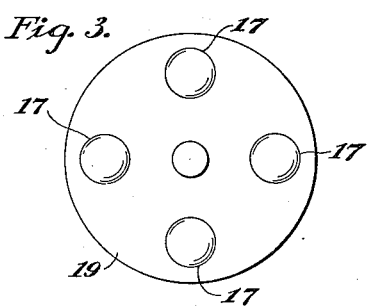
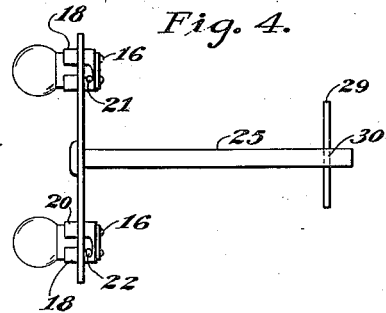
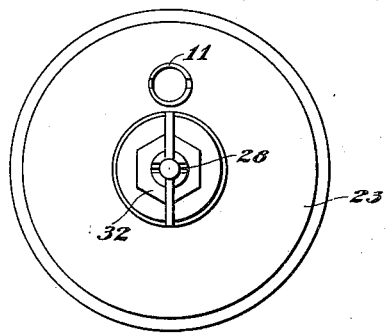
INVENTOR.
Frank E. Gregory.
BY Victor J. Evans
ATTORNEY.

UNITED STATES PATENT OFFICE.

FRANK E. GREGORY, OF SACRAMENTO, CALIFORNIA, ASSIGNOR OF ONE-FOURTH TO GEORGE A. McKINLEY, OF VACAVILLE, CALIFORNIA.

AUTOMOBILE LAMP.

1,426,181.  Specification of Letters Patent.  Patented Aug. 15, 1922.

Application filed June 18, 1920. Serial No. 389,946.

*To all whom it may concern:*

Be it known that I, FRANK E. GREGORY, a citizen of the United States, residing at Sacramento, in the county of Sacramento and State of California, have invented new and useful Improvements in Automobile Lamps, of which the following is a specification.

This invention relates to improvements in lamps for vehicles, and has particular reference to a lamp used as a tail light for an automobile.

One of the objects of this invention is to provide a lamp comprising a series of electric bulbs within a lamp casing, which bulbs will serve as emergency lights when one bulb of the series ceases to function.

Another object of this invention is to provide a tail lamp which includes mechanism for throwing one of a series of lights carried within the lamp casing into operative position upon the extinguishing of another of the series.

A still further object of this invention is to provide a revolvable disk within the casing which will serve as a base support for a series of bulbs, and which will have means connected thereto to throw a new bulb into operative position when one of the series becomes useless.

Much annoyance and inconvenience has been experienced heretofore in the use of electric bulbs in tail lamps of automobiles by virtue of the fact that the bulbs cease to function at most inopportune times. It has repeatedly happened that the driver of an automobile is unaware that his tail lamp is extinguished until notified by someone in authority. If the driver, when this occurs, is fortunate enough to escape a fine, he is considerably inconvenienced by the delay experienced in obtaining a new bulb and replacing the old one. To overcome this annoyance and also for the purpose of impressing those in authority that a new bulb can be readily thrown into operative position, I have devised this form of revolvable disk within the lamp casing which serves as a base support for a series of bulbs, and which has means connected thereto to permit another of the series to be thrown into position when one of the lights ceases to function.

A still further object of this invention is to provide in conjunction with my improved lamp, means for readily attaching the lamp to the license plate of an automobile.

Another object of this invention is to provide a tail lamp of the above mentioned character, which is simple in construction, compact in the arrangement of its parts, easy to operate, strong and durable.

Other objects and advantages of this invention will be apparent during the course of the following description:

In the accompanying drawings forming a part of this specification, and in which like numerals are employed to designate like parts throughout the same, Figure 1 is a front elevation of a lamp, Figure 2 is a side elevation of my improvement attached to a lamp casing, Figure 3 is a front elevation showing the revolvable disk in which the series of bulbs are placed, Figure 4 is a side elevation of the disk shown in Figure 3, and Figure 5 is a rear elevation of the lamp.

In the drawings wherein for the purpose of illustration is shown a preferred embodiment of my invention, numeral 7 designates a lamp casing in which is mounted a standard form of lens 8, and a retaining ring 9. This casing is provided with a centrally located opening 10, and adjacent thereto and formed integral with the casing, is a socket member 11, in which is detachably mounted a terminal 12, which terminal is provided with spring contacts 13 and 14, through which a circuit is established with a conductor 15. This terminal 12 serves to provide the lighting effect in the bulbs when the spring contacts 13 and 14 touch contacts 16 provided on the base of bulbs or lamps 17. Attention is called to the fact that the base of the bulbs may be equipped with one spring contact, which will serve the same purpose as the double spring contacts and contact points shown to advantage in Figures 2 and 4.

It will be noted that these bulbs are in series of four, and are received in socket members 18, which are formed integral with a revolvable disk 19. The sockets have conventional bayonet slots formed therein, which receive studs 21 and 22 formed in the base of the bulb 17. Extending from the base portion 23 of the casing 7, is a tubular member 24 which is externally threaded, and which receives a rod 25 made integral with the revolvable disk 19. Mounted on the rod 25 is a coil spring 26, which prevents the revolvable disk 19 from contacting with an extension 27 formed integral with the base 23 of the casing 7, which spring serves as a tension means and allows easy movement of the rovolvable disk within the casing 7.

The tubular member 24 terminates at its free end thereof in a series of grooves 28, which are shown to advantage in Figures 2 and 5. These grooves receive a turning element 29, which is mounted on an opening 30 provided in the rod 25. This turning element 29 is received in the grooves 28, which grooves serve as stopping means therefor, and hold the turning element 29 in a fixed position when a quarter turn has been made in order to throw the lamp 17 in alignment with the socket 11. On the tubular member 24 there are formed suitable fastening means for attaching the lamp to either a license plate, or a suitable part of an automobile, these means comprising a washer 31, and a nut 32.

In the standard form of automobile, the tail lamp is controlled by a lighting switch which is conveniently placed adjacent the steering wheel of an automobile, and in my device the wires leading from the lighting switch enter the terminal 12, and the connection made between the spring contacts 13 and 14 and the contact points 16, causes the bulbs to be illuminated. It will thus be seen that by providing a revolvable disk on which the bulks are mounted, and having means for turning the revolvable disk, I have provided a novel structure in which the bulbs may be thrown into operative position so that their contact points will be in alignment with the spring contacts of the terminal. Thus it can be readily seen that when one of the bulbs ceases to function, application of a simple turning movement to the revolvable disk, through the medium of the integral rod 25, will cause another of the series of bulbs to be thrown into operative position. Attention is called to the fact that when it is desired to turn the revolvable disk 19, all that is necessary to do is to withdraw the terminal 12 from the socket 11, so that there will be no bending of the spring contact elements 13 and 14. After this has been done, the terminal is again inserted in the socket member 11, and the operation of my device is effected. Spring 26 merely maintains the disk in a forward position as determined by part 29, abutting notches 28, and also allows the disk to yield toward the rear wall of the lamp casing.

In use, the device is operated as follows: When one of the bulbs ceases to function, application of the turning element 29 will cause movement to be imparted to the integral rod 25. This rod will rotate disk 19 and will cause a bulb to be thrown into position for contact with the spring contacts 12, and the lighting effect will at once take place. The combination of the grooves formed on the tubular member and the turning element, serves to regulate the adjustment of the bulbs and hold the same in alignment.

It is to be understood that the form of my invention herewith shown and described, is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination of a lamp casing having a centrally located aperture in the rear wall thereof, a rotatable disk mounted within said casing, said disk having a rearwardly extending rod adapted to enter the aperture of said casing, a series of lamps detachably mounted on said disk, contacts detachably carried on said casing and adapted to register with said lamps when said disk is rotated, means for rotating said disk, tension means mounted between said disk and said casing, said tension means serving to position the said disk and prevent rotation of said disk.

2. In a device of the character described, the combination of a lamp casing having a centrally located aperture in the rear wall thereof, a rotatable disk mounted within said casing, a rod rearwardly extending therefrom and adapted to enter the aperture of said casing, lamps detachably mounted on said disk, a tubular bracket member secured to said casing and adapted to receive therein said rod, a turning element penetrating said rod and adapted to rotate said rod and said disk, means formed on the end of said tubular bracket for preventing rotation of said rod, tension means encircling said rod at a point between said disk and said casing, said tension means serving to cause said turning element to engage said first mentioned means, contacts carried on the interior of said casing, said contacts being adapted to contact said lamps individually as said disk is manually rotated.

In testimony whereof I affix my signature.

FRANK E. GREGORY.